Oct. 7, 1958
C. EDEN
2,855,450
METHOD FOR AVOIDING DECOMPOSITION OF MELTING VESSELS
Filed June 14, 1955
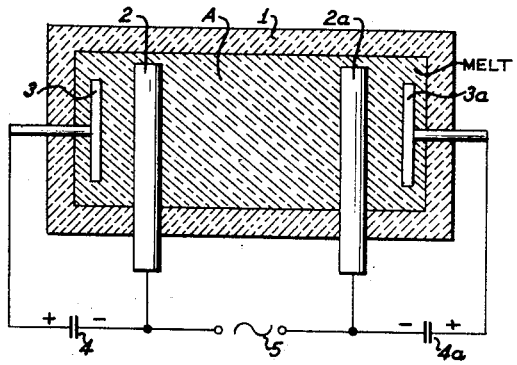
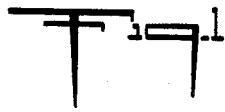
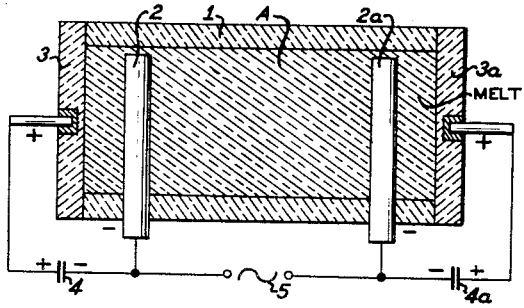
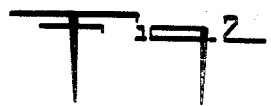
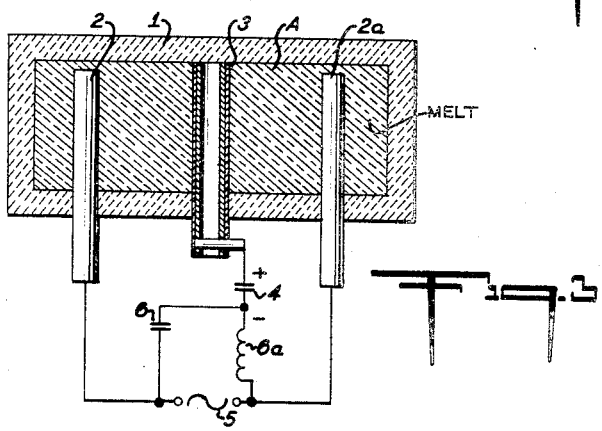
INVENTOR
CARSTEN EDEN
BY Burgess, Dinklage & Sprung
ATTORNEYS

United States Patent Office

2,855,450
Patented Oct. 7, 1958

2,855,450

METHOD FOR AVOIDING DECOMPOSITION OF MELTING VESSELS

Carsten Eden, Mainz, Germany, assignor to Jenaer Glaswerk Schott & Gen., Mainz, Germany, a German corporation Application June 14, 1955, Serial No. 515,465

Claims priority, application Germany July 20, 1954

7 Claims. (Cl. 13—6)

The present invention relates in general to a method and means for avoiding or reducing the decomposition of specially exposed parts of a melting vessel. More particularly, the present invention concerns a method for protecting glass melting furnaces.

For protecting the inner walls of melting vessels from being attacked and corroded by the materials to be melted therein, it has already been proposed prior to this invention to form a protective coating on the inner surface of such walls by passing an electric current through the bath of molten material and by using the inner walls as an anode for such passage. By such prior method, the protective coating is formed directly by the substance of the molten bath. The coating thus produced between the bath and the walls protects the latter from the direct action of the molten bath.

The present invention, however, follows along a much more simple and fundamentally different path, proceeding from the known fact that, owing to the very high temperatures prevailing in the melting vessels, there is always an extensive dissociation of the melting charge, that essential portions of the vessel will be destroyed by electrolytic decomposition, and that such decomposing effect is caused primarily by the anions present in the bath and is especially destructive if the molten material has a high concentration in hydrogen ions.

It is the object of the present invention to provide a new method for reducing the destructive effect of the anions, and particularly the hydrogen ions, so as to avoid or at least materially reduce the electrolytic decomposing action upon the walls of the melting vessel and specially exposed parts thereof.

This new method is applicable especially to glass melting furnaces and consists in providing the anodes which are inserted into the molten bath opposite to the specially exposed parts of the melting vessel with a negative potential of a direct current.

The protective action produced by the method according to the present invention extends primarily to those parts of the melting vessel which consist of metals, such as, for example, molybdenum, or of carbon and particularly graphite.

The inventive effect of the new method is that the anions are repelled by the parts which are especially exposed to corrosion or decomposition and can therefore not exert their destructive action.

The scope of applicability of the new method is very extensive and by no means limited to any particular embodiment. Thus, for example, if the parts of the melting vessel which are to be especially protected consist of an electrically non-conductive material, the present invention provides the expedient of coating the same with a covering of electrically conductive material, for example, a suitable metal or graphite.

More specifically, the invention is applicable particularly for protecting overflows or spill parts, bridge passages, float gauges, channels, stirrers, springs, plungers, and the like insofar as they consist of metals, carbon or graphite, or may be coated with such materials.

If it concerns a melting furnace in which the material is heated by means of joulean heat, it is a further object of the present invention to provide the heating electrodes which are inserted into the molten material or the material to be melted with a negative direct current potential by superimposing a direct current of relatively lower strength to the usual alternating heating current.

In all cases of the application of the new method, one or several additional electrodes which are acting as anodes are inserted into the material. These anodes are preferably made of materials which are as insensitive to oxidation as possible, such as, for example, platinum or platinum metals or their alloys, although electrodes consisting of a semiconductive material, such as, for example, zirconium oxide, may also be used.

Further objects, features, and advantages of the present invention will be apparent from the following detailed description thereof, as well as from the accompanying diagrammatic drawings, in which:

Fig. 1 shows a top view upon an electric melting furnace and the electric connections required for carrying out the method according to the invention.

Fig. 2 shows a melting furnace similar to that shown in Fig. 1 but provided with anodes of a different type and construction; while Fig. 3 shows a melting furnace similar to that shown in Figs. 1 and 2 but provided with an anode according to still another modification.

Referring to the drawings, and first particularly to Fig. 1, the heating electrodes 2 and 2a are inserted laterally through the walls 1 of the melting furnace and into the melting charge A. The electrodes 2 and 2a are supplied with alternating current from a source of current 5.

According to the present invention, additional electrodes 3 and 3a are inserted into the bath and connected to the positive terminals of two sources of direct current 4 and 4a, while the negative terminals thereof are connected to the heating electrodes 2 and 2a so that the alternating heating current is superimposed by a direct current.

As the result of the negative charging of the electrodes 2 and 2a relative to the electrodes 3 and 3a which are acting as anodes, the cations of the melting bath will be repelled therefrom and cannot exert their destructive action.

Therefore, the wear and corrosion of the heating electrodes is considerably reduced by the application of the present invention, and the additional advantage will be obtained that the melting bath itself will not be polluted by substances resulting from the decomposition of the electrodes.

According to the embodiment of the invention shown in Fig. 1, the anodes 3 and 3a preferably consist of platinum strips or a tube or rod of ceramic material which is coated with platinum.

In the embodiment shown in Fig. 2, the electrodes 3 and 3a may consist of a material, such as, for example, zirconium oxide, which, within the range of the melting temperature of the material to be treated, constitutes an electric semiconductor. These additional electrodes may be made in the shape of a rod, tube, or plate, or as a part of the wall, for example, as a tank block.

In the embodiment shown in Fig. 3, only a single additional electrode is provided intermediate the two heating electrodes 2 and 2a. The filter elements 6 and 6a protect the source of direct current 4 from the alternating current 5.

Although my invention has been illustrated and described with reference to the preferred embodiments thereof, I wish to have it understood that it is in no way Having thus fully disclosed my invention, what I claim is:

1. In an electric melting furnace having heating electrodes, and a source of alternating current electrically connected to said electrodes, the improvement for protecting said electrodes from electrolytic decomposition which comprises means for applying a negative potential of direct current to said electrodes.

2. In an electric melting furnace having heating electrodes and a source of alternating current electrically connected to said electrodes, the improvement for protecting said electrodes from electrolytic decomposition which comprises at least one additional electrode positioned in said furnace and a source of direct current with its positive pole electrically connected to said additional electrode and its negative pole electrically connected to at least one of said heating electrodes.

3. Improvement according to claim 2 in which said source of direct current is of lower strength than said source of alternating current.

4. In an electric melting furnace for treating glass by means of joulean heat, having heating electrodes and a source of alternating current electrically connected to said electrodes, the improvement which comprises means for applying a negative potential of direct current to said electrodes.

5. In an electric melting furnace for treating glass by means of joulean heat having heating electrodes and a source of alternating current connected to said electrodes, the improvement which comprises at least one additional electrode positioned in said furnace and a source of direct current of lower strength than said source of alternating current with its positive pole electrically connected to said additional electrode and its negative pole electrically connected to at least one of said heating electrodes.

6. In the method of operating an electric melting furnace having heating electrodes immersed in the melt, in which alternating current is applied to the heating electrodes, the improvement which comprises applying a negative potential of direct current to said electrodes.

7. Improvement according to claim 6 in which said direct current is of lower strength than said alternating current.

References Cited in the file of this patent

UNITED STATES PATENTS

| 1,792,674 | Bellis | Feb. 17, 1931 |
| 2,545,619 | Lambert | Mar. 20, 1951 |

FOREIGN PATENTS

| 29,418 | Great Britain | of 1913 |
| 917,925 | Germany | Sept. 16, 1954 |